(12) United States Patent
Simic

(10) Patent No.: US 8,967,651 B1
(45) Date of Patent: Mar. 3, 2015

(54) MULTIPURPOSE BICYCLE TRAILER

(71) Applicant: Milorad Simic, Thousand Oaks, CO (US)

(72) Inventor: Milorad Simic, Thousand Oaks, CO (US)

( * ) Notice: Subject to any disclaimer, the term of this patent is extended or adjusted under 35 U.S.C. 154(b) by 0 days.

(21) Appl. No.: 13/964,256

(22) Filed: Aug. 12, 2013

Related U.S. Application Data

(60) Provisional application No. 61/682,302, filed on Aug. 12, 2012.

(51) Int. Cl.
*B62K 27/00* (2006.01)
*B62K 27/12* (2006.01)

(52) U.S. Cl.
CPC .............. *B62K 27/003* (2013.01); *B62K 27/12* (2013.01)
USPC ............ 280/204; 280/30; 280/656; 280/638; 280/639; 280/47.24; 280/47.25; 280/7.1

(58) Field of Classification Search
USPC ................ 280/204, 30, 656, 638, 639, 47.24, 280/47.25, 7.1
See application file for complete search history.

(56) References Cited

U.S. PATENT DOCUMENTS

| | | | |
|---|---|---|---|
| 5,857,695 A * | 1/1999 | Crowell | 280/651 |
| 6,152,462 A * | 11/2000 | Barrett | 280/30 |
| 6,733,026 B1 * | 5/2004 | Robberson et al. | 280/415.1 |
| 6,845,991 B1 * | 1/2005 | Ritucci et al. | 280/30 |
| 7,857,327 B2 * | 12/2010 | Reed | 280/30 |
| 7,967,302 B2 * | 6/2011 | Coetzee | 280/47.18 |
| 2006/0181064 A1 * | 8/2006 | Maxwell | 280/656 |
| 2007/0132210 A1 * | 6/2007 | Tai | 280/656 |
| 2012/0292890 A1 * | 11/2012 | Lomas et al. | 280/656 |

* cited by examiner

*Primary Examiner* — Joseph Rocca
*Assistant Examiner* — Marlon Arce
(74) *Attorney, Agent, or Firm* — Sandy Lipkin

(57) ABSTRACT

A bicycle trailer that is foldable into a small storable position that expands to include a bicycle trailer that can be configured to convert into a lounge chair, a dolly, a baby bed with or without a canopy, a table or a wagon using an improved tow bar and trailer hitch that easily attaches and detaches to a bicycle as desired.

12 Claims, 17 Drawing Sheets

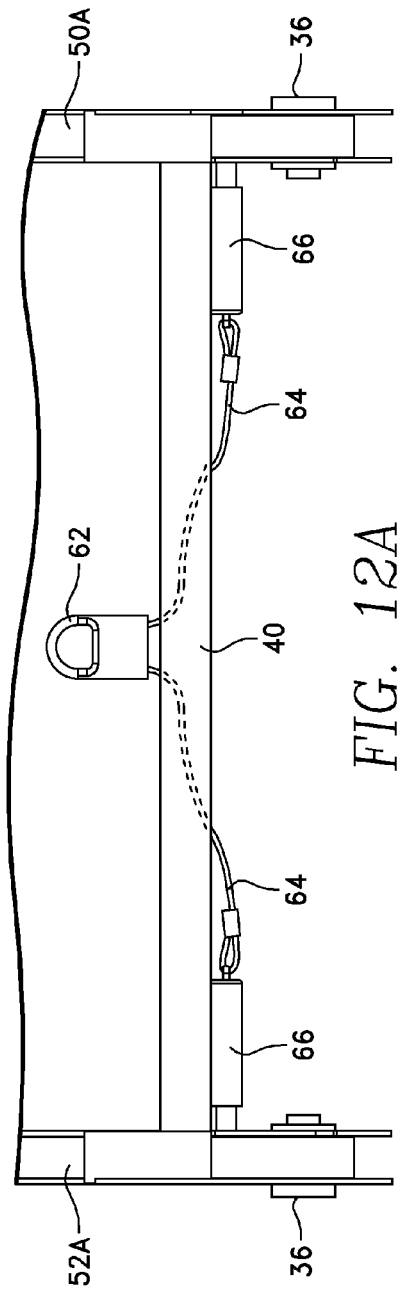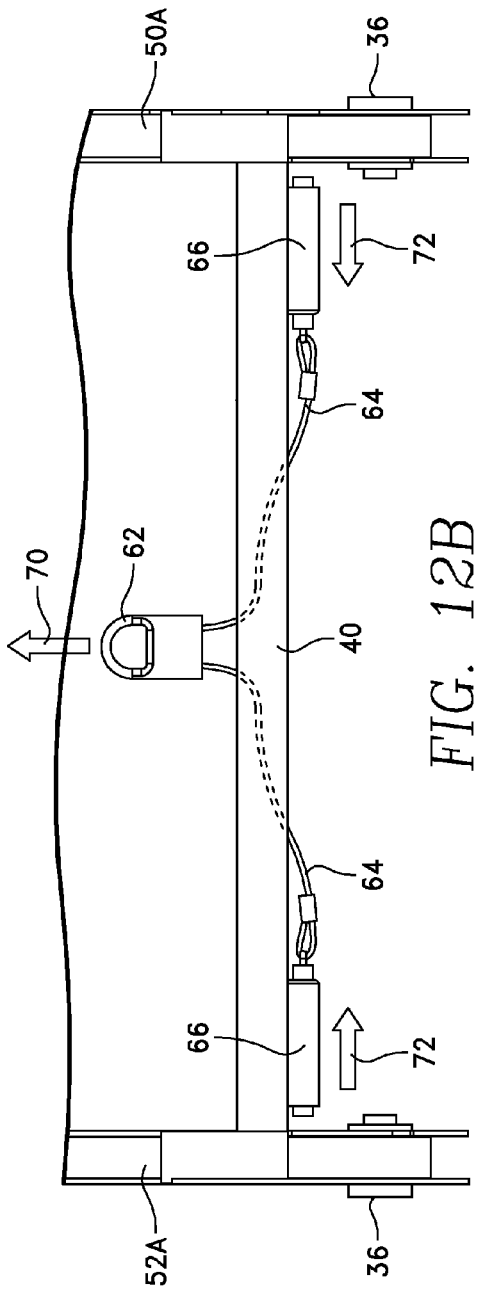

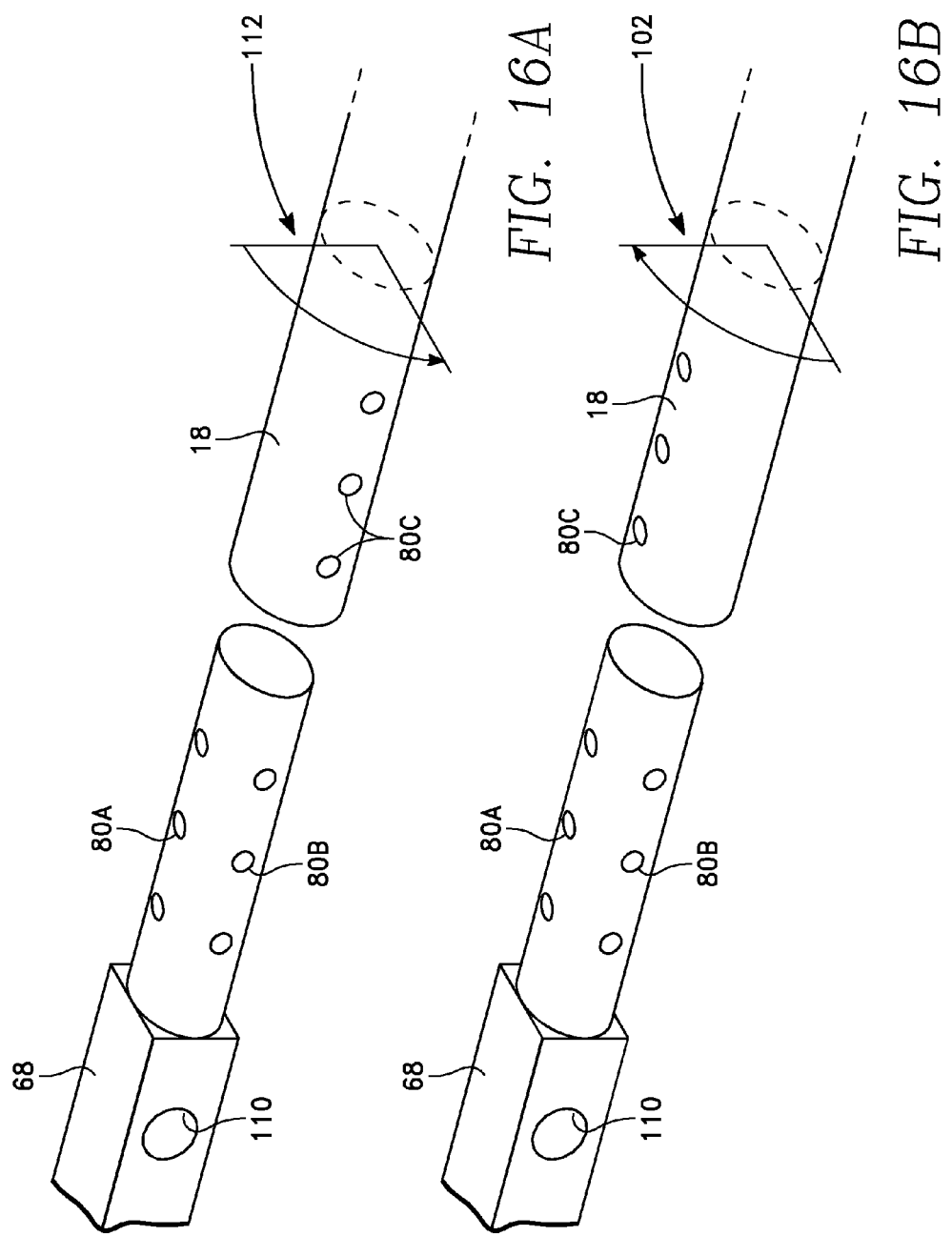

MULTIPURPOSE BICYCLE TRAILER

REFERENCE TO PRIOR APPLICATION

This application claims priority of the provisional patent application 61/682,302, filed Aug. 12, 2012 entitled MULTIPURPOSE BICYCLE TRAILER by Milorad Simic.

BACKGROUND OF THE INVENTION

1. Field of the Invention

The field of this invention relates generally to the field of bicycle trailers and more specifically toward an improved bicycle trailer that can be converted into multiple different devices, that attaches easily and efficiently to a bicycle and that can be folded into a small easily storable position.

2. Description of the Prior Art

Bicycle trailers are in common usage for those travelling via bicycle in order to help transport children, pets and other useful items as one would using a car with storage space. Often times after arriving at one's destination in the bicycle and trailer, there is a need for other items, such as a dolly, a table, a lounge chair, a baby bed or a wagon, all items which would be cumbersome if not impossible to carry along inside the trailer.

It is the object of the instant invention to provide a bicycle trailer that folds up into a small size that stores easily that can also convert into a dolly, a table, a lounge chair, a baby bed and/or a wagon for use either after transport to a second location or in use at or near the location where it is stored.

SUMMARY OF THE INVENTION

The basic embodiment of the present invention teaches a convertible device that is towable behind a towing vehicle comprising: a main frame portion said main frame portion being substantially rectangular shape and having a first side, a second side, a third side and a fourth side wherein said first and third sides are substantially parallel to each other while said second and fourth sides are substantially parallel to each other wherein each side is substantially linear having a first end and a second end and a middle portion; a first attachment means located on said first end of said first and third sides; a second attachment means located on said second end of said first and third sides; a third attachment means located on said middle portion of said first and third sides; a first detachable wheel for attachment to one of said first, second or third attachment means and a second detachable wheel for attachment to a second of said first, second or third attachment means wherein said first and second wheels are attached in positions parallel to each other; a first foldable portion attached to said second side of said main frame portion wherein said first foldable portion is rotatable at least 180 degrees; a second foldable portion attached to said fourth side of said main frame portion wherein said second foldable portion is rotatable at least 180 degrees; a first pair of legs attached to said first ends of said first side and said second side that is rotatable at least 180 degrees around said attachment means; a second pair of legs attached to said second ends of said first side and said second side that is rotatable at least 180 degrees around said attachment means; and a tow bar that is attached to said main frame portion in at least one point on said main frame portion.

The above embodiment can be further modified by defining that said second and fourth sides are hollow.

The above embodiment can be further modified by defining that a first vertical pull pin is located substantially in the center of said second side and a second vertical pull pin is located substantially in the center of said fourth side wherein said first and second pull pins are attached to cables that extend through said hollow portions and attached to a first vertical release pin one side and a second vertical release pin on said second side wherein the action of pulling up on either of said vertical pull pins releases each of said horizontal release pins wherein said release pins releasably attach to said first sides and/or said second sides of said first and third sides of said main frame.

The above embodiment can be further modified by defining that said tow bar attaches to said second side of said main frame and extends in a diagonal direction and attaches a second time to said first side of said main frame and then extends outward from main frame.

The above embodiment can be further modified by defining that a handle is attachable to said tow bar to create flexibility in attachment to a tow vehicle.

The above embodiment can be further modified by defining that said handle is rotatable.

The above embodiment can be further modified by defining that a sturdy material is attached to said first foldable portion and extended and attached to said second foldable portion creating a surface therebetween.

The above embodiment can be further modified by defining that a further section of sturdy material is attached connecting said first foldable portion and said second foldable portion creating an enclosed space between said main frame, said first fold portion and said second foldable portion.

The above embodiment can be further modified by defining that said first pair of legs and said second pair of legs are folded inward and flush in the same plane with said main frame portion.

The above embodiment can be further modified by defining that said first pair of legs and said second pair of legs are rotated downward from said main frame portion thereby creating a study support for said main frame portion.

The above embodiment can be further modified by defining that said first pair of legs and said second pair of legs are rotated upward from said main frame portion thereby creating support for sidewalls that can be enclosed or secured thereby creating a space for the placement of items therein.

The above embodiment can be further modified by defining that said first pair of legs is extended outward and flush in the same plane with said main frame portion while said second pair of legs is rotated substantially 90 degrees from said main frame portion thereby creating a handle with said first pair of legs and a platform to hold items to be moved with said second pair of legs.

Another embodiment of the instant invention defines a device for attaching a trailer to a bicycle comprising: a first piece said first piece further comprising: a back wall; a platform extending substantially 90 degrees from said back wall; a flange situated on said platform for attachment thereto of a handle of a trailer; a center aperture on said back wall; and a plurality of side apertures on said back wall; and a second piece said second piece further comprising: a back wall; a center aperture on said back wall; and a plurality of side apertures on said back wall wherein said first piece and said second piece are adjustable relative to each other providing at least two points of attachment to said trailer through said center apertures and at least one of said side apertures.

BRIEF DESCRIPTION OF THE DRAWINGS

For a better understanding of the present invention, reference is to be made to the accompanying drawings. It is to be understood that the present invention is not limited to the precise arrangement shown in the drawings.

FIG. 12 A is a front view of the foot end of the trailer configuration showing the release pins in the secured position.

FIG. 12B is a front view of the foot end of the trailer configuration showing the release pins in the release position.

FIG. 16A is a close up view of the attachment portion of the tow bar to the hitch showing the rotatability of the hitch through offset holes.

FIG. 16B is a close view of the attachment portion of the tow bar to the hitch showing the hitch rotated 90 degrees.

DETAILED DESCRIPTION OF A PREFERRED EMBODIMENT

Figure 1:
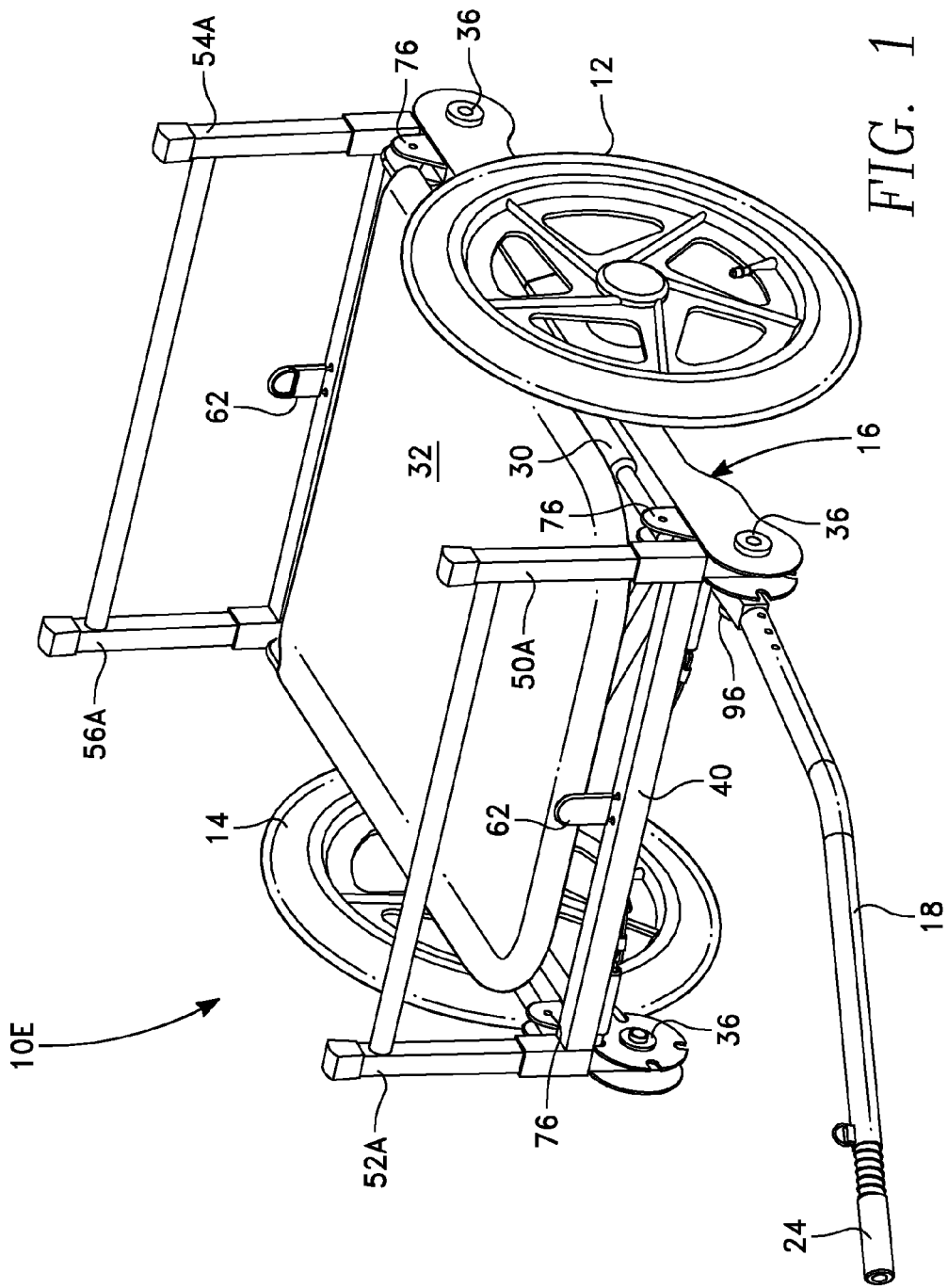
FIG. 1 is a perspective view of the bike trailer of the instant invention with the tow bar and hitch attached.

Turning to the drawings, the preferred embodiment is illustrated and described by reference characters that denote similar elements throughout the several views of the instant invention.

Figure 15A:
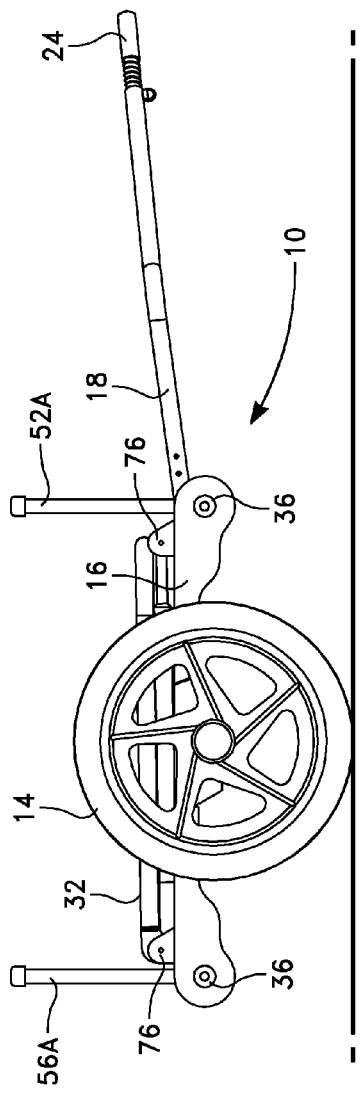
FIG. 15A is a side view of the bicycle trailer configuration of the instant invention wherein the tow bar extends directly from the bottom of the trailer.
Figure 15B:
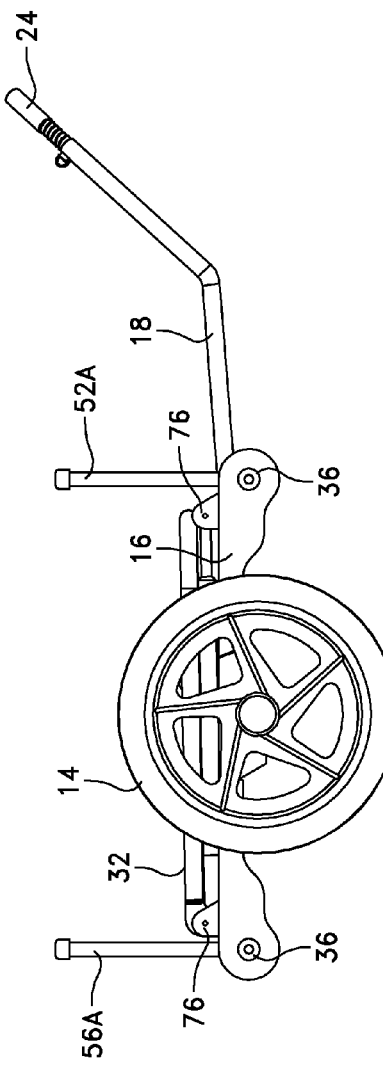
FIG. 15B is a side view of the wagon configuration of the instant invention wherein the hitch is angled from the tow bar creating a pulling handle.

The preferred embodiment is a compact foldable bicycle trailer 10 (FIGS. 1 and 15A) that easily converts into other useful configurations, such as a lounge chair 10A (FIGS. 2 and 9), a dolly 10B (FIG. 4), a baby bed 10C (FIGS. 3 and 10), a table 10D (FIG. 8) or a wagon 10E (FIGS. 1 and 15B).

The device 10 has detachable wheels 12, 14 that can be placed in separate parts of the main frame 16 depending on the configuration. As a trailer 10 it is optimal for the wheels 12, 14 to be attached to the center portion 34 of the parallel sides 42, 46 of the main frame 16. For use as a dolly 10B it is optimal for the wheels 12, 14 to be attached to the rear portions 36 of the parallel sides 42, 46 of the main frame 16.

The device also includes a detachable tow bar 18 that attaches to the axle 20 and extends along the bottom 22 of the trailer 10 at a diagonal angle 68 connecting at two points, first on one side of the main frame and second on a second side thereby providing improved stability during transport. The tow bar 18 attaches at one of the end spots 36 on one side and the center spot 34 on an adjacent side. Each end of the diagonal bar 68 has its own hole 78, 110 for attachment to each of the sides. A detachable hitch 24 is used to attach to the tow bar 18 depending on the configuration desired and is adjustable in length depending on the size of the wheels on the bicycle 26 used as the towing vehicle. The hitch 24 can be used as a handle when used in the wagon 10E configuration by rotating 112 the hitch 24 90 degrees 102 through holes 80 found on both the tow bar 18 and the hitch 24. (See FIGS. 15A-16B)

There are two series of holes 80 on the tow bar 18 and one corresponding series of holes 80 on the hitch 24. By rotating the hitch 24 90 degrees 112 the hitch provides an attachment end that can extend directly away from the trailer 10 and attach to the towing vehicle 26 (FIG. 15A) or can be angled upward 102 for easy manual pulling in the wagon configuration (FIG. 15B).

Figure 2:
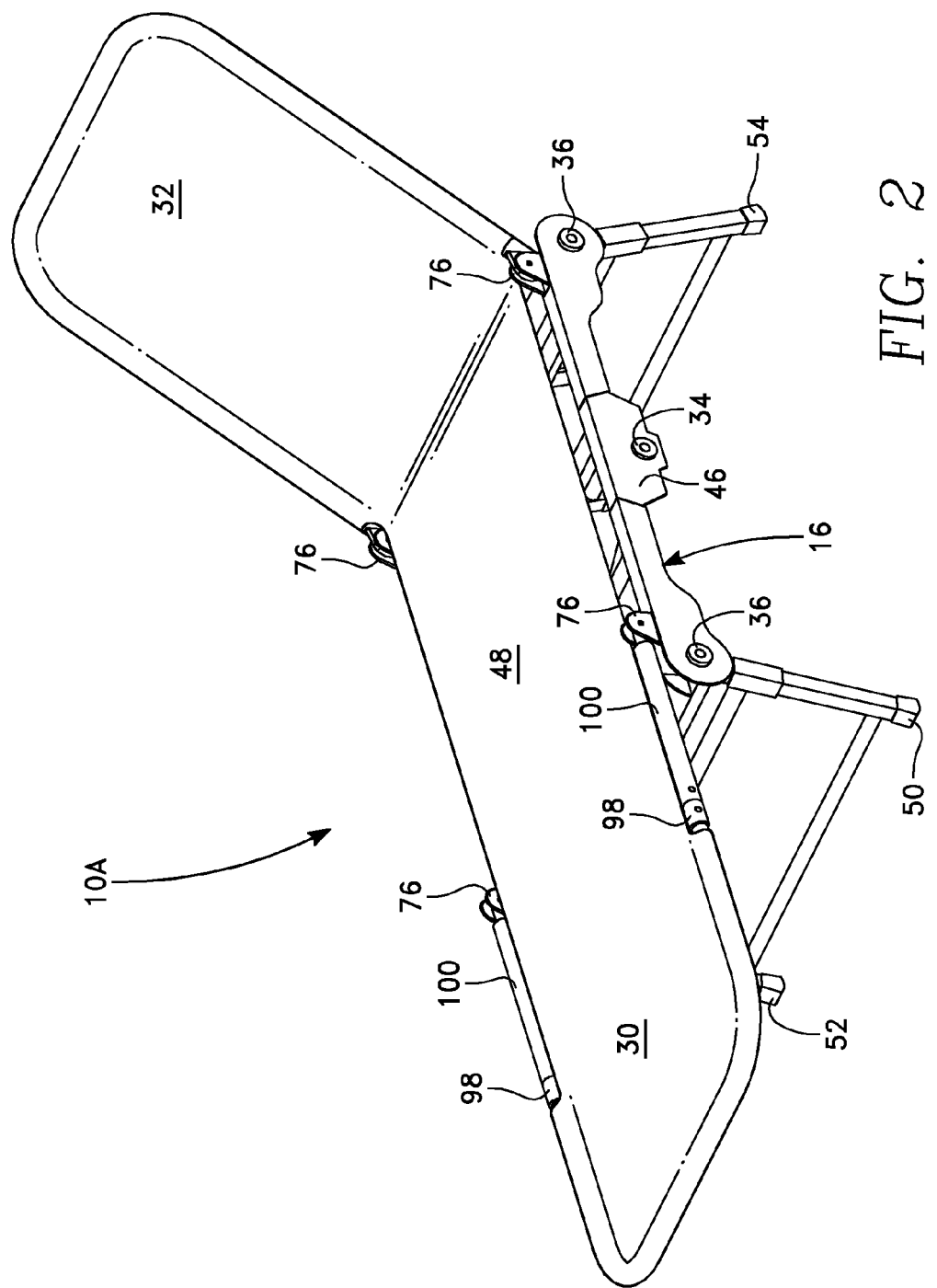
FIG. 2 is a perspective view of the bike trailer of the instant invention in the lounge chair configuration.
Figure 3:
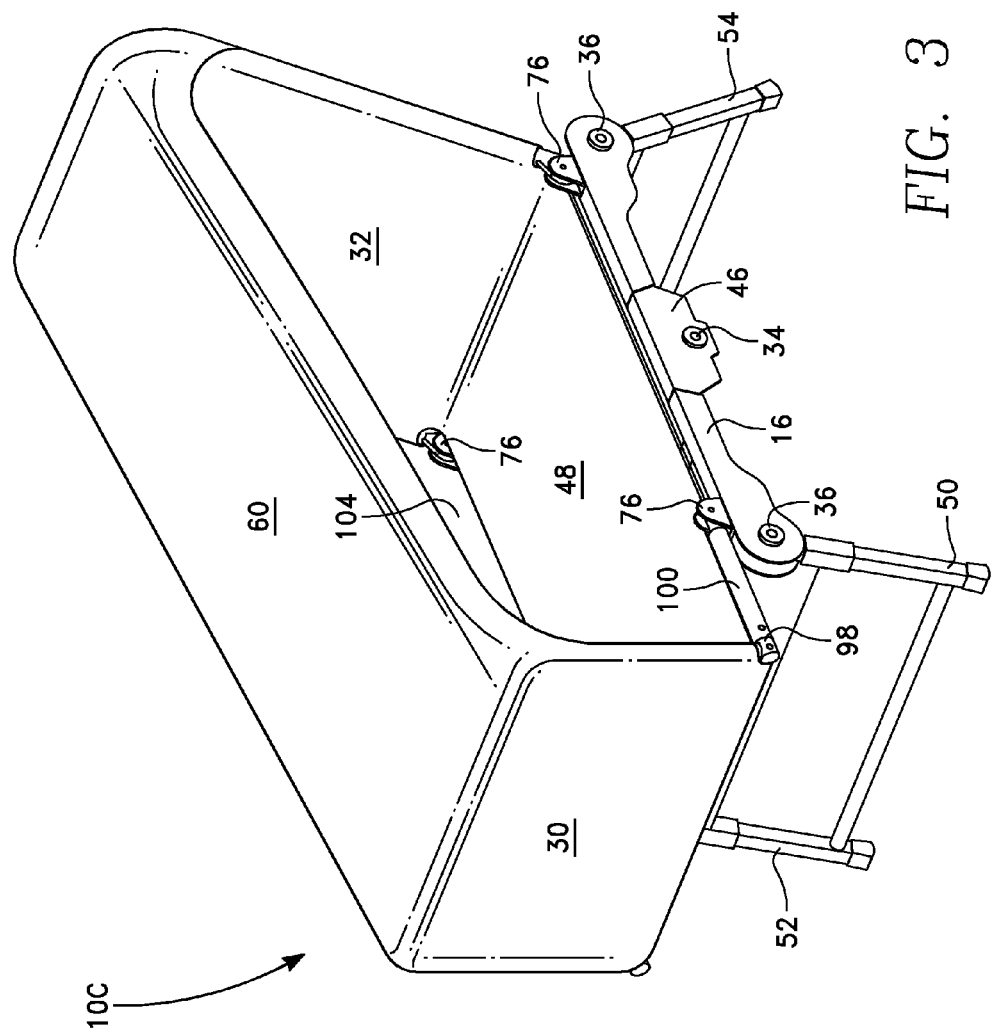
FIG. 3 is a perspective view of the bike trailer of the instant invention in the baby bed configuration.
Figure 9:
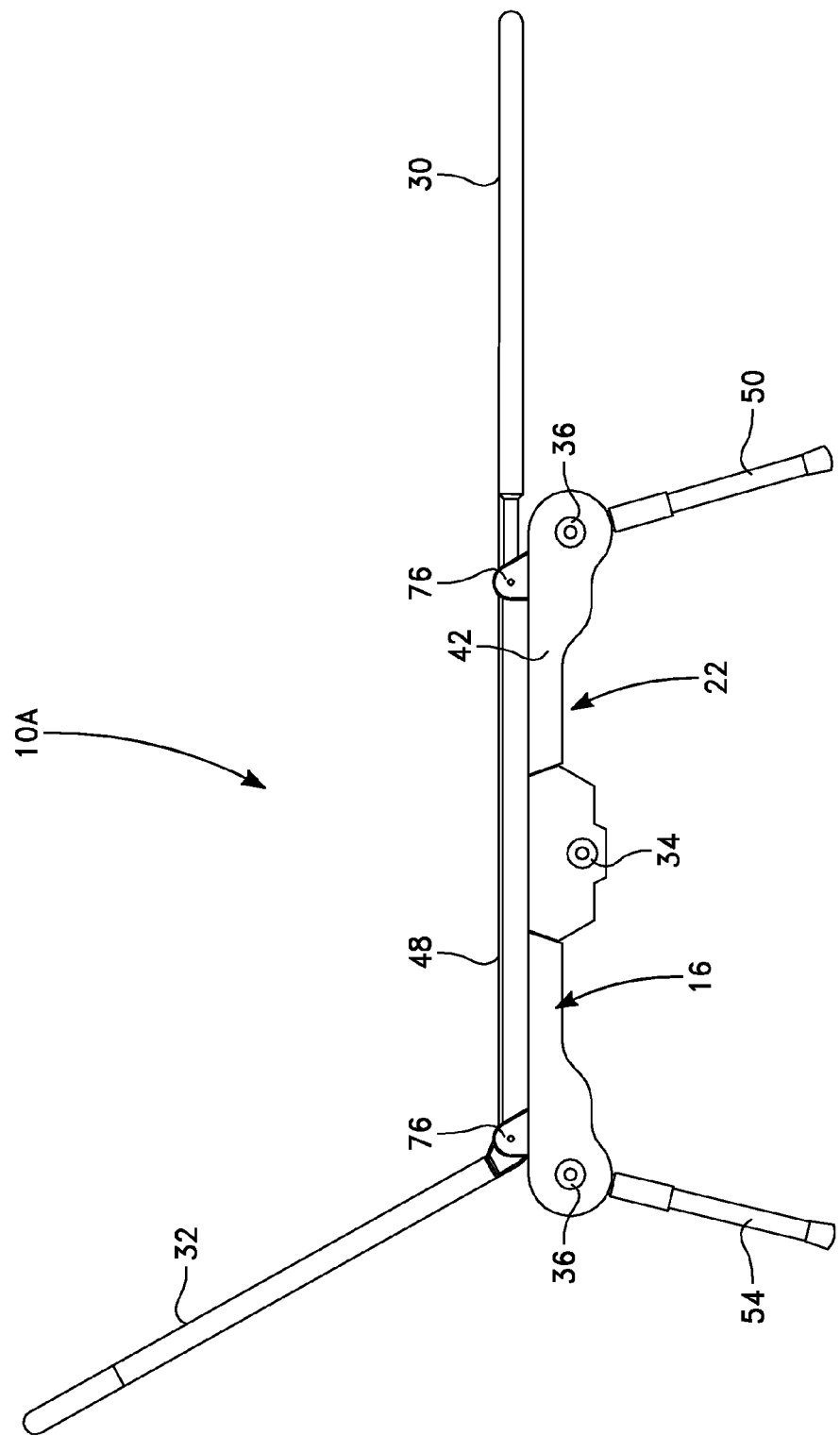
FIG. 9 is a side view of the bike trailer of the instant invention in the lounge chair configuration.
Figure 10:
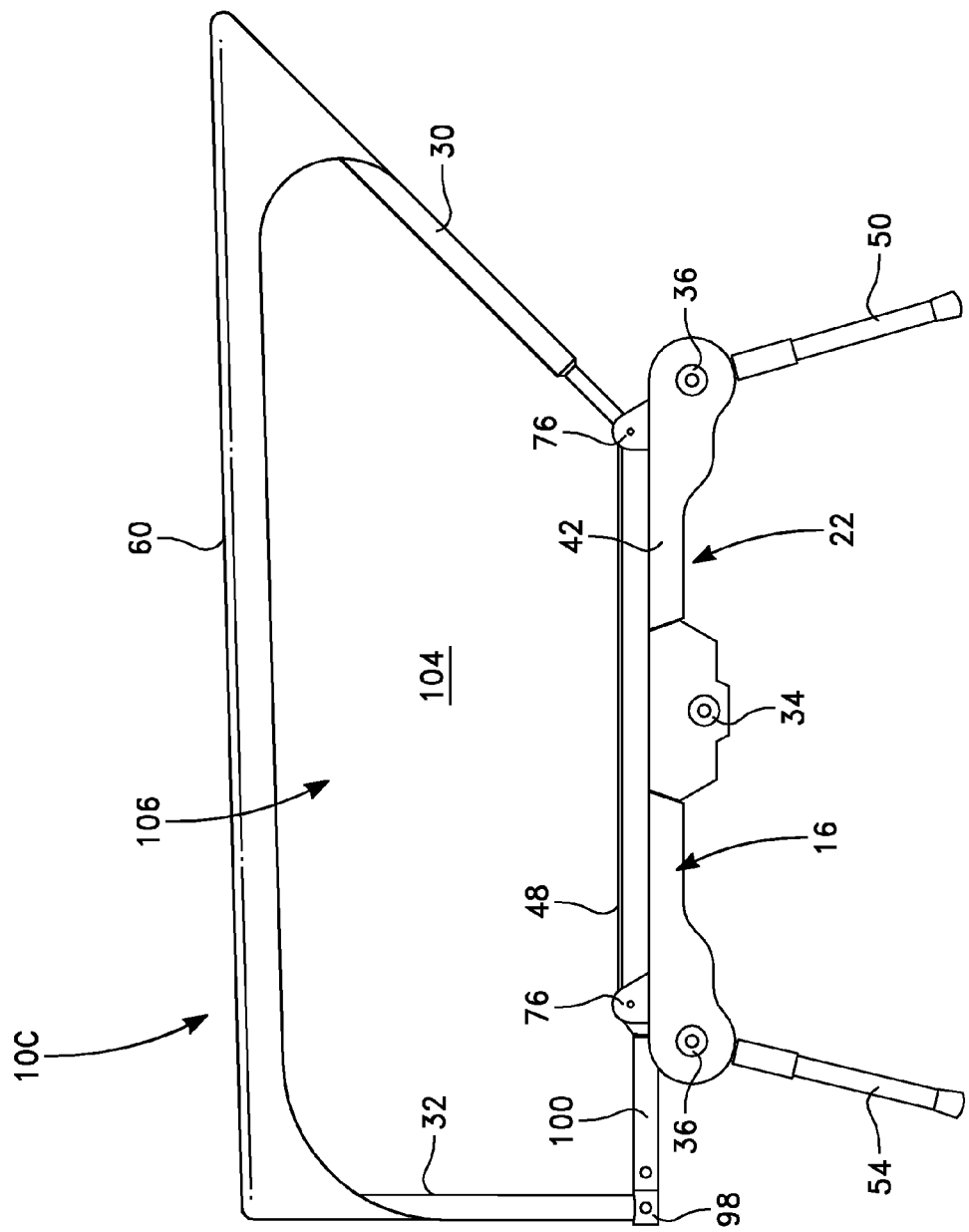
FIG. 10 is a side view of the bike trailer of the instant invention in the baby bed configuration.

The lounge chair 10A configuration as seen in FIGS. 2 and 9 has a metal frame and can be converted into a baby bed 10C using a canopy 60 as seen in FIG. 3. In the baby bed configuration 10C the back portion 30 is bendable to a smaller angle to create the canopy. The bendable portion 100 includes a spring mechanism 98 that allows the side to bend at a section somewhere between the main frame and the top of the portion.

Figure 8:
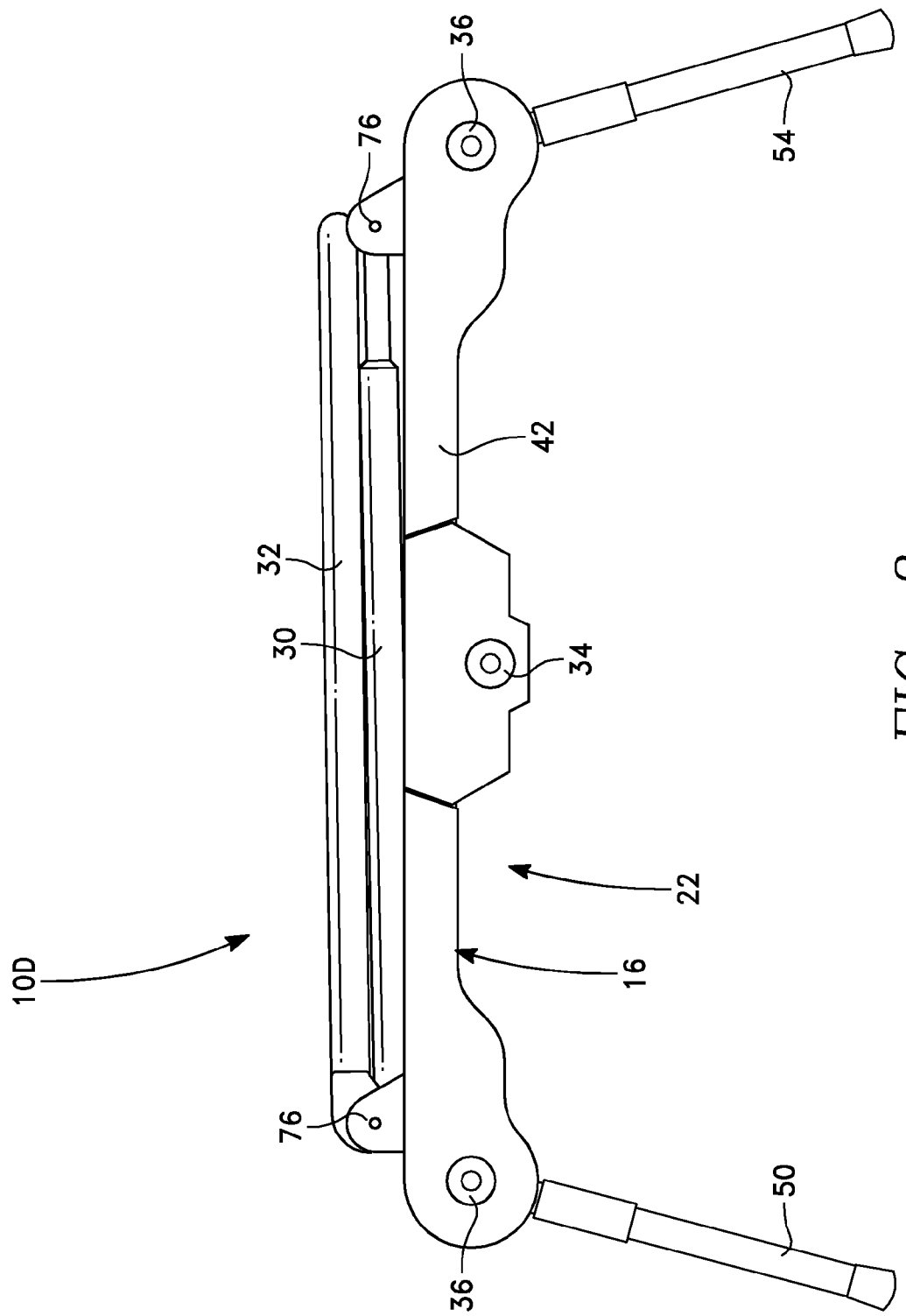
FIG. 8 is a side view of the bike trailer of the instant invention with the wheels removed and the legs extended into the table configuration.

The lounge chair 10A configuration can also be converted into a table 10D as seen in FIG. 8 by keeping the foot/front portion 30 and back 32 portions folded in the stored position. An elongated table is also possible by unfolding the front/foot portion 30 and back portions 32 into a position flush with the main frame 16.

The wagon 10E and trailer 10 configurations are identical (FIG. 1) varying only on whether or not the hitch 24 is attached to the trailer 10 or pulled by hand and at what angle the hitch is oriented 102, 112. (See FIGS. 15A-15B)

Figure 4:
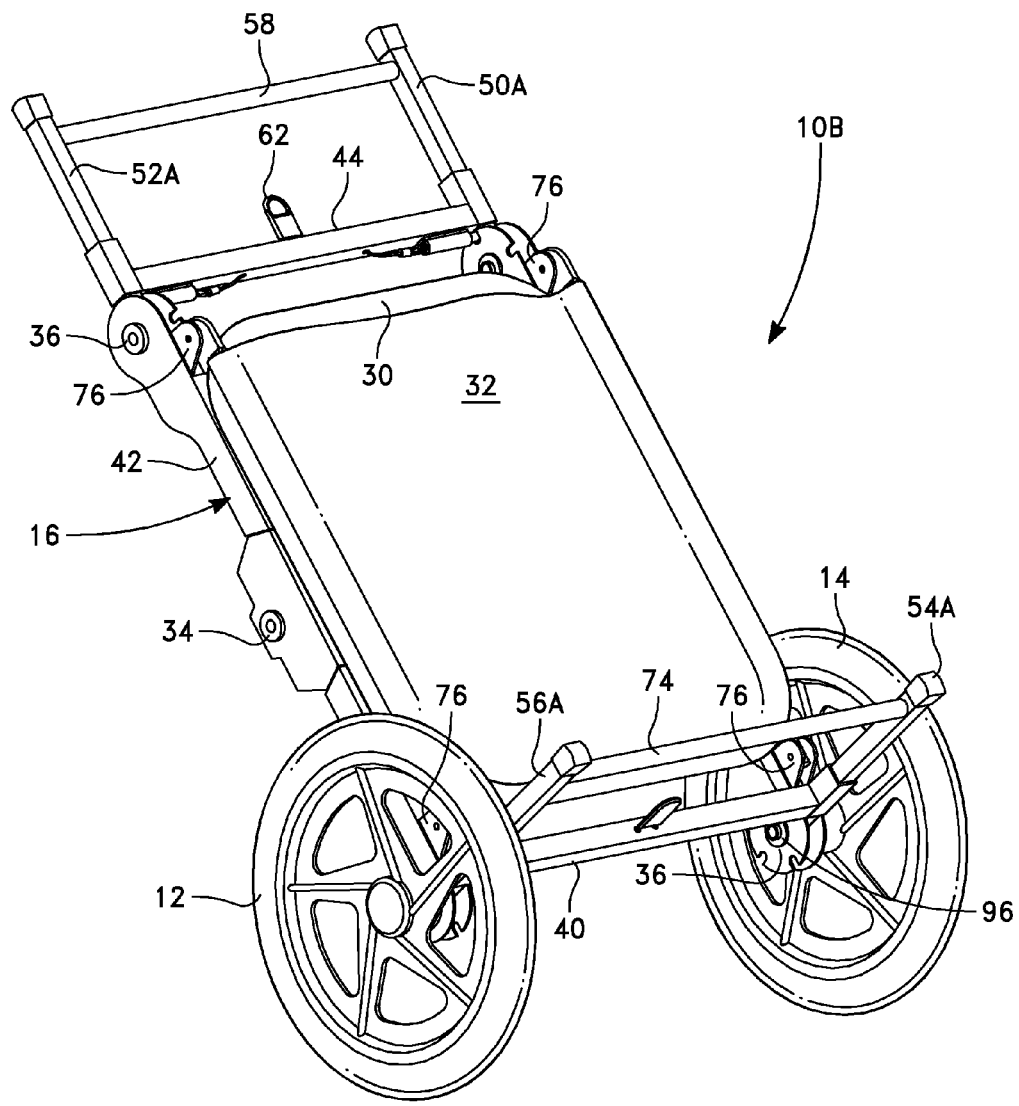
FIG. 4 is a perspective view of the bike trailer of the instant invention in the dolly configuration.

The dolly 10B configuration as seen in FIG. 4 requires the removal of the wheels 12, 14 from the center portion 34 of the main frame 16 and reattachment to the ends 36. This configuration also requires that one set of legs 52A, 50A be pivoted into a position flush with the main frame 16 to create a handle 58 while the opposing set of legs 54A, 56A are pivoted into a position substantially perpendicular to the main frame 16 creating a platform onto which items to be carried can be placed. The legs/sidewalls 50, 52, 54, 56, 50A, 52A, 54A, 56A are the same pieces of the devices, varying in function depending on their position relative to the main frame 16.

The device 10 in its fundamental form has a main frame section 16 that forms the foundation of each configuration. It is substantially rectangular in shape and includes four sides 40, 42, 44, 46. It has a supportive middle section 48 made of canvas or other sturdy material. Attached to the main frame section 16 on one side 44 is a pivotably movable back section 32 while the opposing side 40 has attached to it a pivotably movable front/foot section 30. Both of these sections 30, 32 pivot around standard joints 76 found in lounge chairs and can be placed in one of three positions, i.e., flush with the main frame 16, substantially 45 degrees from the main frame 16 and substantially 90 degrees from the main frame 16.

Between the sides 40, 44 that are attached to the back 32 and front/foot 30 sections are parallel sides 42, 46 that include locations 34, 36 onto which can be attached detachable wheels 12, 14, either in the center of each side 34 or on either end 36. This mechanism is shown in detail in FIG. 17.

The wheel 12 is attached in this illustration to the center portion 34 of the side of the main frame 16. A pin 96 with grooves 114 passes through a hole 78 in the diagonal portion 68 of the tow bar 18 and then through the center portion 34 of the side of the main frame 16 and affixing to the center portion 116 of the wheel 12.

Figure 13:
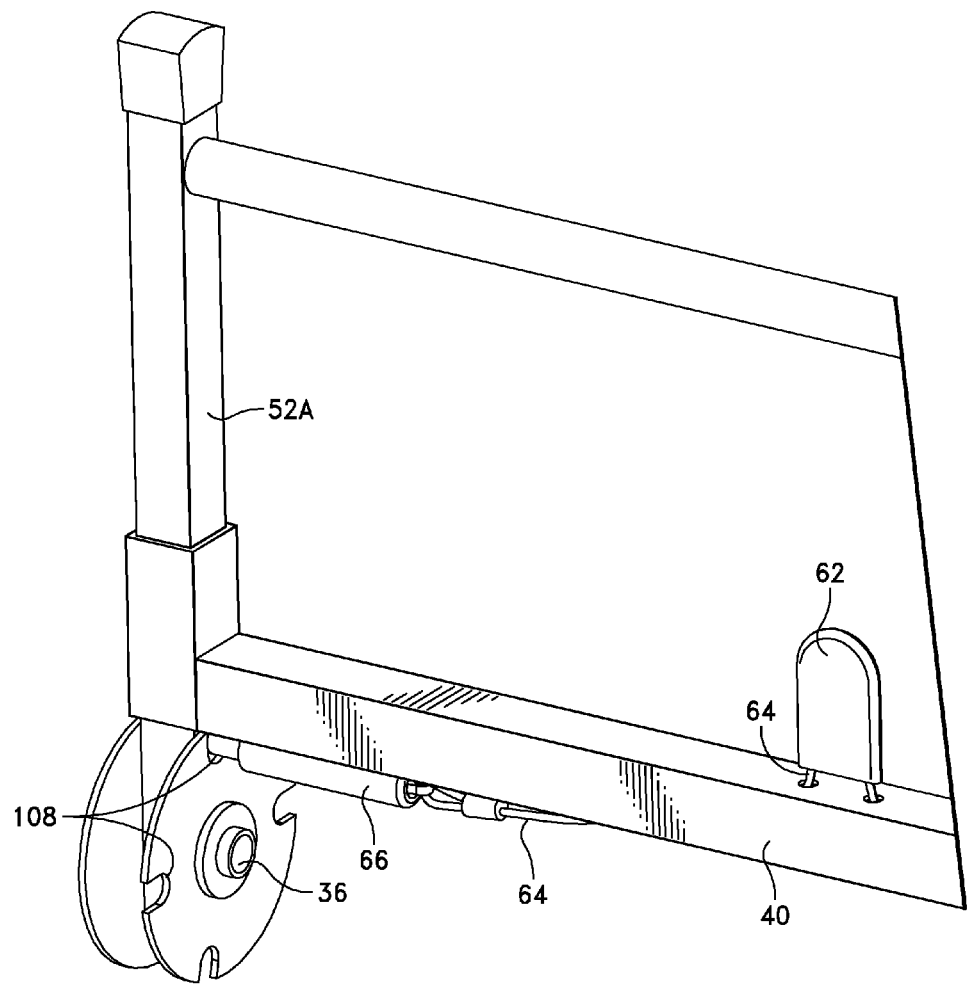
FIG. 13 is a close up view of one of corners of the foot end of the trailer configuration.

Each end 36 of the parallel sides 42, 46 includes pivotable joints from which legs 50, 52, 54, 56 can be folded in or expanded out to create the table 10D and/or lounge chair 10A configurations using the release pin mechanism shown in FIGS. 12A-13. Divots 108 in the pivotable joints provide lockable positions in which the legs/sidewalls 50, 52, 54, 56, 50A, 52A, 54A, 56A can be locked.

Figure 11:
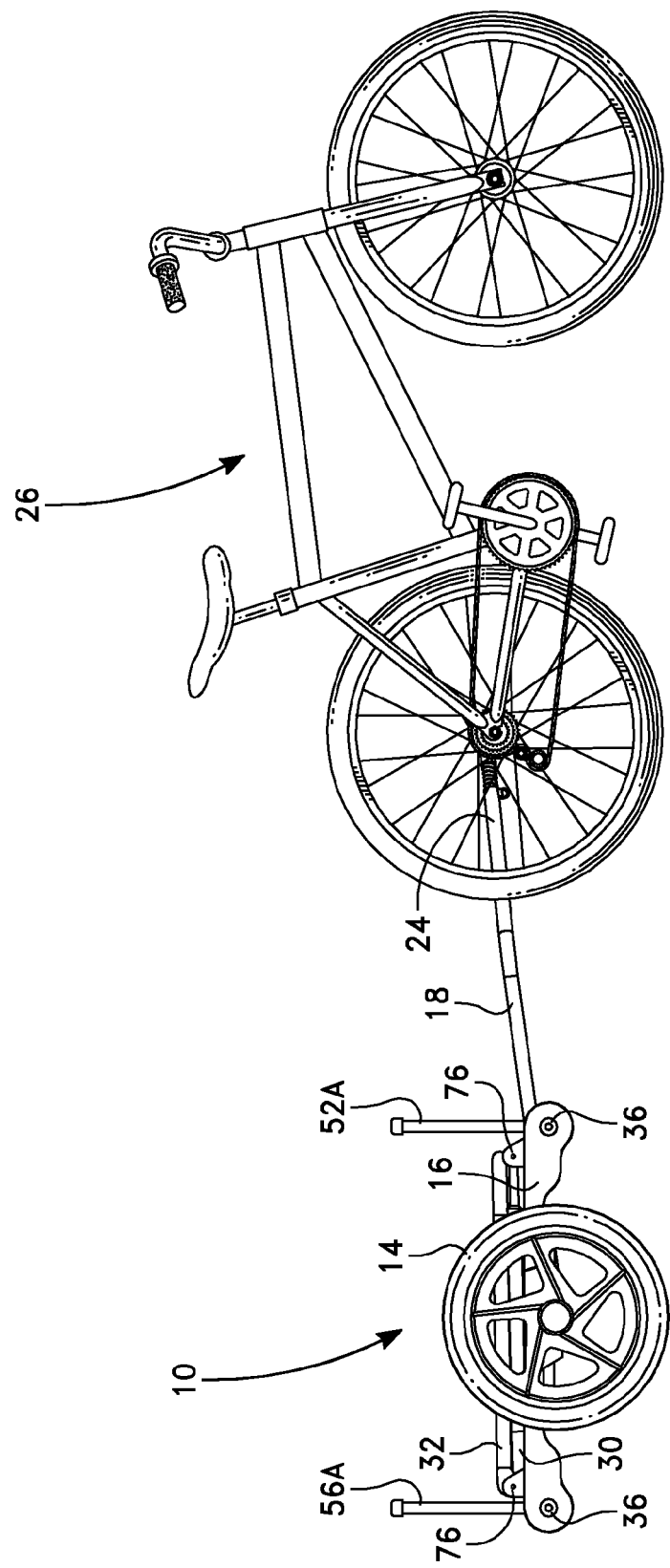
FIG. 11 is a side view of the bike trailer of the instant invention in the folded position with wheel and tow bar attached and hitched up to a towing vehicle, such as a bicycle.

In the trailer 10 and wagon 10E configurations, the front/foot 30 and back 32 sections are pivoted to overlay the main frame section 16 as seen in FIGS. 1 and 11. The leg/sidewall sections can be pivoted into a vertical position 50A, 52A, 54A, 56A pointing upwards and being locked into place as shown in FIG. 1 or can be in the flush and stored position as shown in FIG. 11 depending on the needs for storage and carrying. The legs/sidewalls are moved and secured into place utilizing the locking mechanism as illustrated in FIGS. 12A-13.

The space created by the leg sections in this vertical position 50A, 52A, 54A, 56A creates space for the creation of sidewalls to the trailer configuration creating a "box" into which to place any desired items to be transported. The items are securable either with more supportive material such as canvas or being tied down with straps or other appropriate device. In these configurations, the wheels 12, 14 are attached to the center portion of the parallel sides 42, 46. The wheels 12, 14 are locked into place using locks located on the wheels 12, 14. (See FIG. 17)

Figure 5:
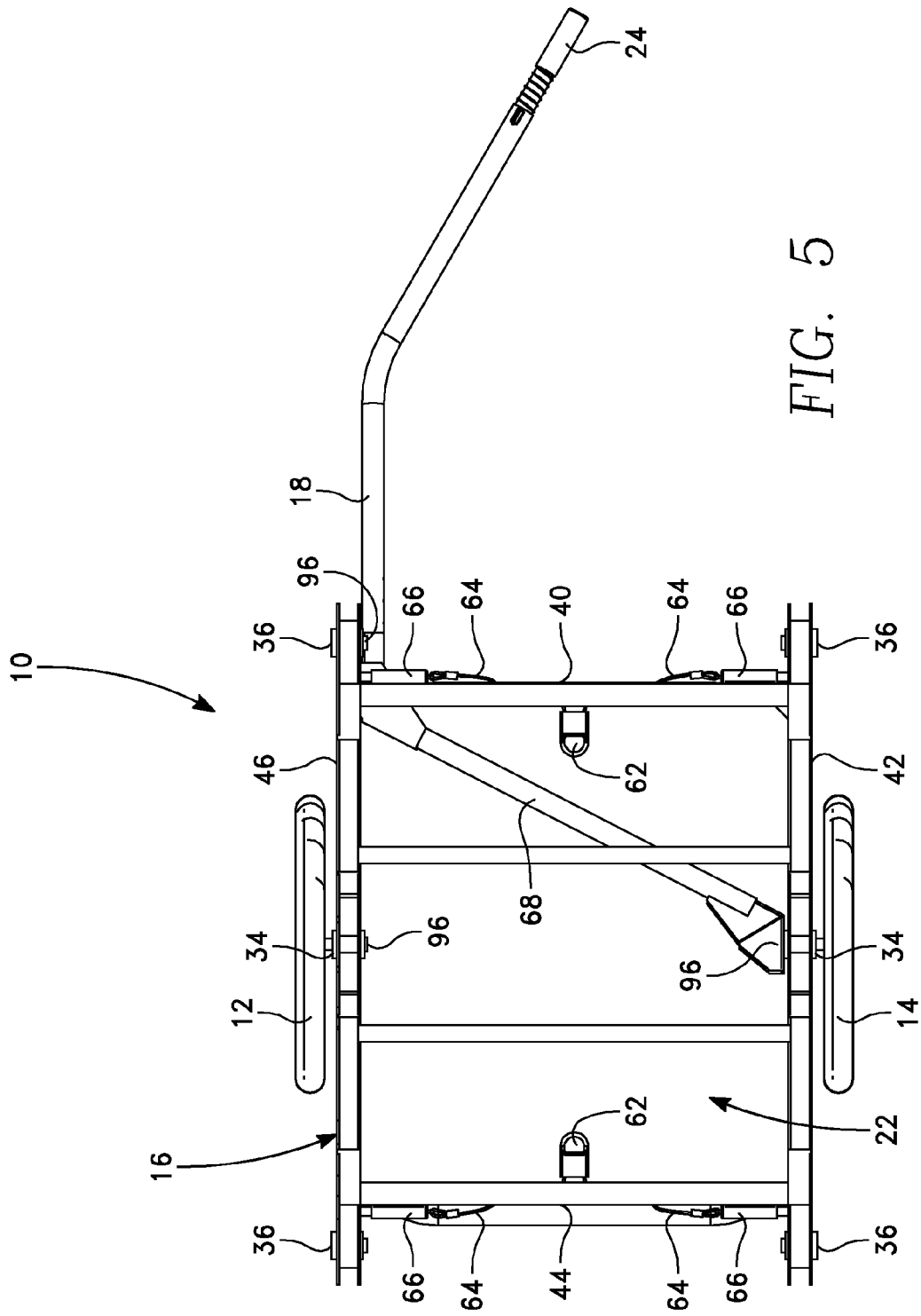
FIG. 5 is a bottom view of the bike trailer of the instant invention with the wheels attached showing the diagonal positioning of the tow bar with the hitch attached.
Figure 14A:
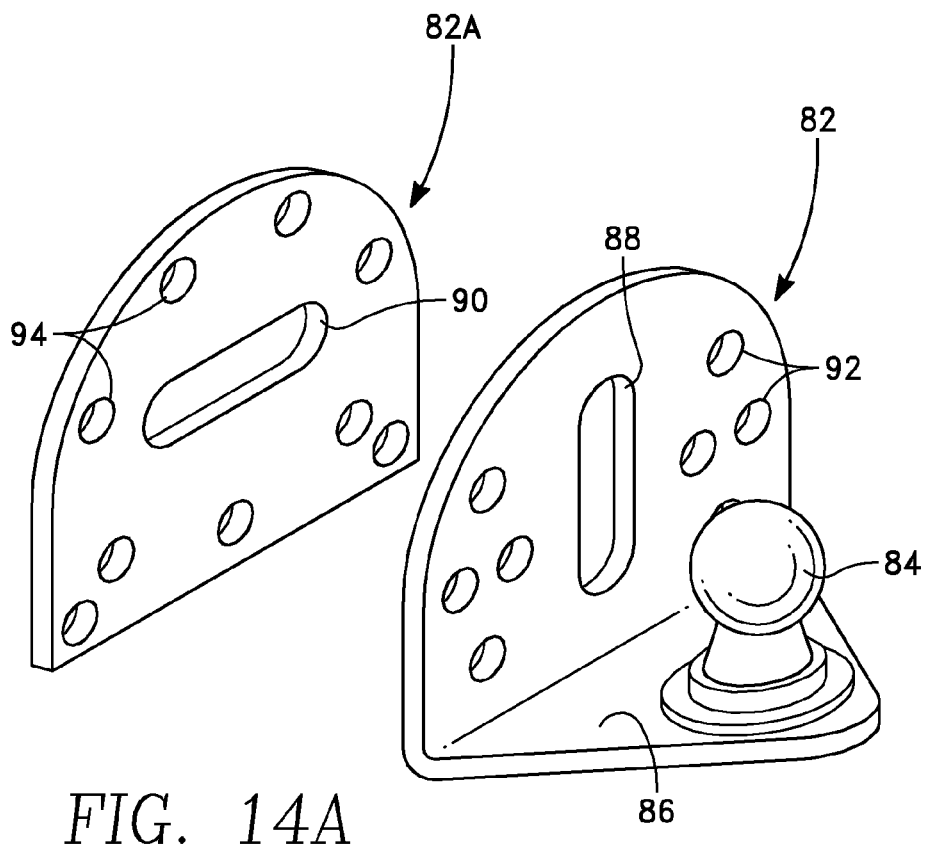
FIG. 14A is an exploded view of the double attachment device for attachment to the towing vehicle.
Figure 14B:
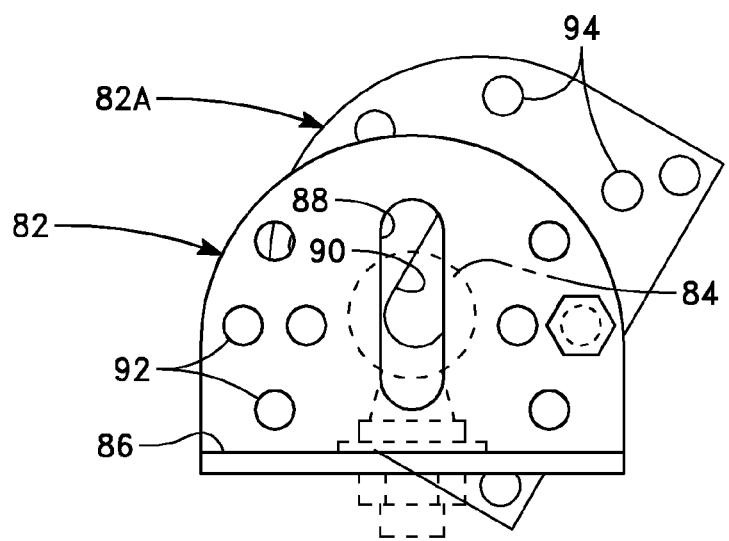
FIG. 14B is a front view of the double attachment device for attachment to the towing vehicle.

A tow bar 18 is used for the trailer 10 and wagon 10E configurations (FIG. 1). As seen in FIG. 5, the tow bar 18 is attached to the underside 22 of the main frame 16 in a diagonal position 68 on two sides 42, 40 and then extends outward from the bottom of the main frame 16. This provides stability during use. For use as a bicycle trailer 10, the detachable hitch 24 is adjustable in height depending on the size of the wheels on the bicycle through attachment of the tow bar 18 to the hitch at any of the desired positions of the holes 80 (See FIGS. 16A-16B). The hitch 24 then attaches to the bicycle 26 with an adjustable attachment as seen in FIGS. 14A-14B.

The attachment consists of a first part 82 and a second part 82A. The first part 82 includes a back wall and a supporting surface 86 that extends substantially 90 degrees from the back wall and upon which sits the hitching element 84. The back wall includes a center aperture 88 and a plurality of side apertures 92. The second part 82A is just a back wall with a similar profile as that of the first part 82 and includes a center aperture 90 and a plurality of side apertures 94. As seen in FIG. 14B the first part 82 and the second part 82A are adjustable in position relative to each other to provide optimal attachment to the size and dimensions of whatever towing vehicle is used. The attachment device should be secured with one bolt through the center apertures 88, 90 of each part 82, 82A and side apertures 92, 94 of each part 82, 82A as needed.

When used as a wagon 10E, or hand cart, the front section of the tow bar 18 is rotated and locked in an upward position and used as a handle to pull the device. (See FIG. 15B) Furthermore, both the tow bar 18 and the hitch 24 are fabricated in angled positions that allow for easy storage next to each other when the device 10 is in the storage position (See FIG. 6)

In the lounge chair 10A, table 10D and baby bed 10C configurations, the wheels 12, 14 and tow bar 18 are removed. The back section 32 is pivoted forward to an open and adjustable angled and elevated position for the lounge chair 10A configuration. The front/foot 30 section is pivoted forward to an open position while the leg/sidewall sections 50, 52, 54, 56 are pivoted downward into the appropriate position to support the lounge chair 10A. The legs/sidewalls 50, 52, 54, 56 are secured by the locking mechanism illustrated in FIGS. 12A-13. The baby bed configuration 10C is identical to the lounge chair configuration 10A but with the addition of a stretched material such as canvas 60 that extends between the back side 32, the front/foot side 30 creating a top and a wall 104 along the back between the two sides 30, 32, thereby creating a shaded space 106 under which a baby or small child (or even a pet) can rest away from the sun. The manipulation of the back part 30 creates an additional center angle that is possible through a movable piece 100 that is held in the desired position through a spring mechanism 98. The table configuration 10D is also identical to the lounge chair 10A configuration with the option of keeping the back 32 and front/foot 30 sections folded or expanded.

Figure 17:
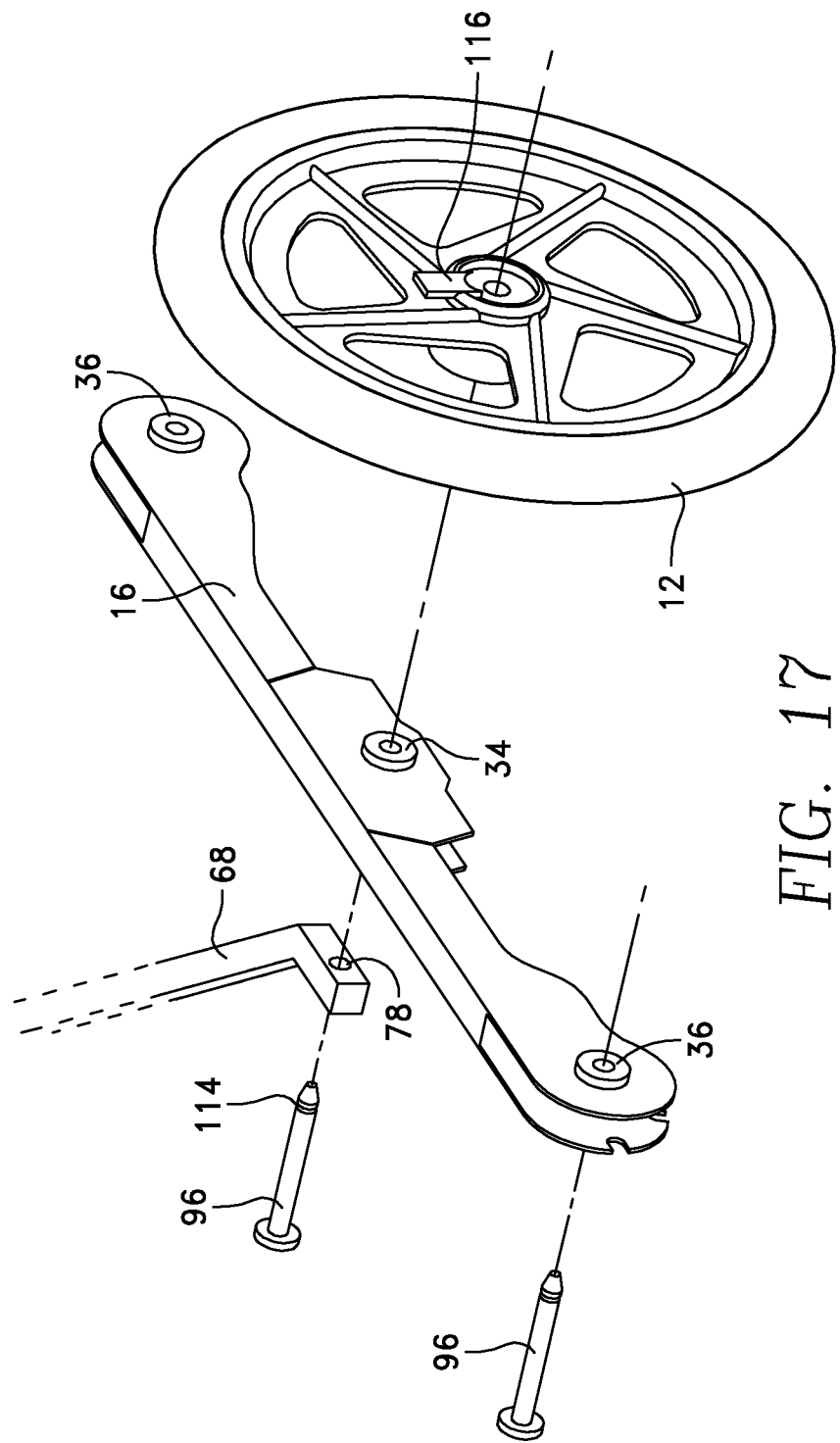
FIG. 17 is an exploded view of the attachment mechanism of one of the wheels to the center portion of one side of the main frame.

In the dolly 10B configuration, the wheels 12, 14 are attached to either of the rear position 36 of the parallel sides 42, 46 and locked into place with locks (See FIG. 17). The back 32 and front/foot 30 sections are pivoted into the folded position over the main frame 16 while the rear leg section 50A, 52A is pivoted and locked into the vertical position pointing upward while the front leg section 50A, 52A is pivoted and locked into an open forward position and used as a handle 58 to pull the device. It is to be understood that the wheels 12, 14 could be attached to either end 36 of the parallel sides 42, 46 so that the leg sections that form the handle 58 or the platform 74 could be at either end 40, 44 of the main frame 16.

Figure 6:
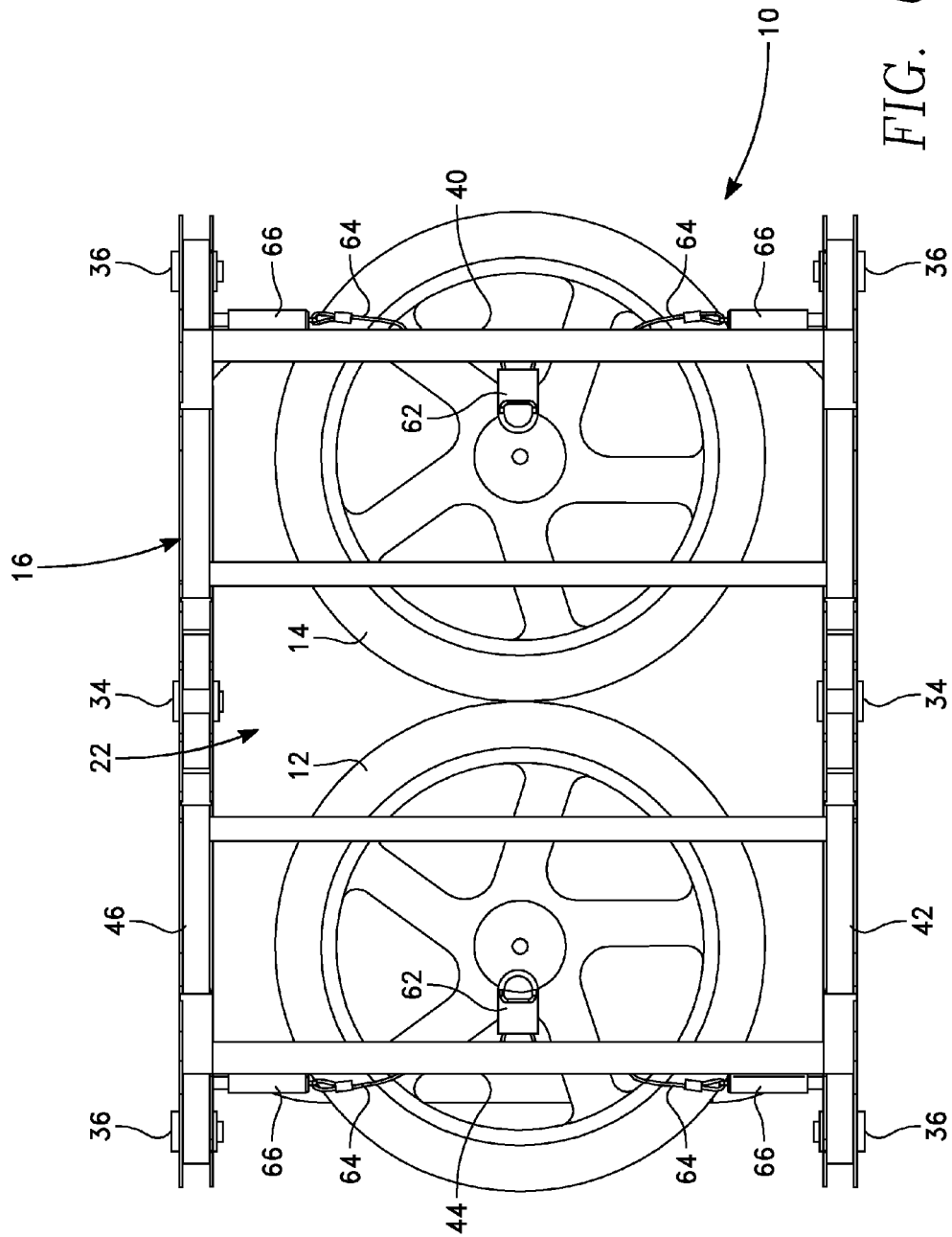
FIG. 6 is a bottom view of the bike trailer of the instant invention with the wheels detached without the tow bar attached in the storing position.
Figure 7:
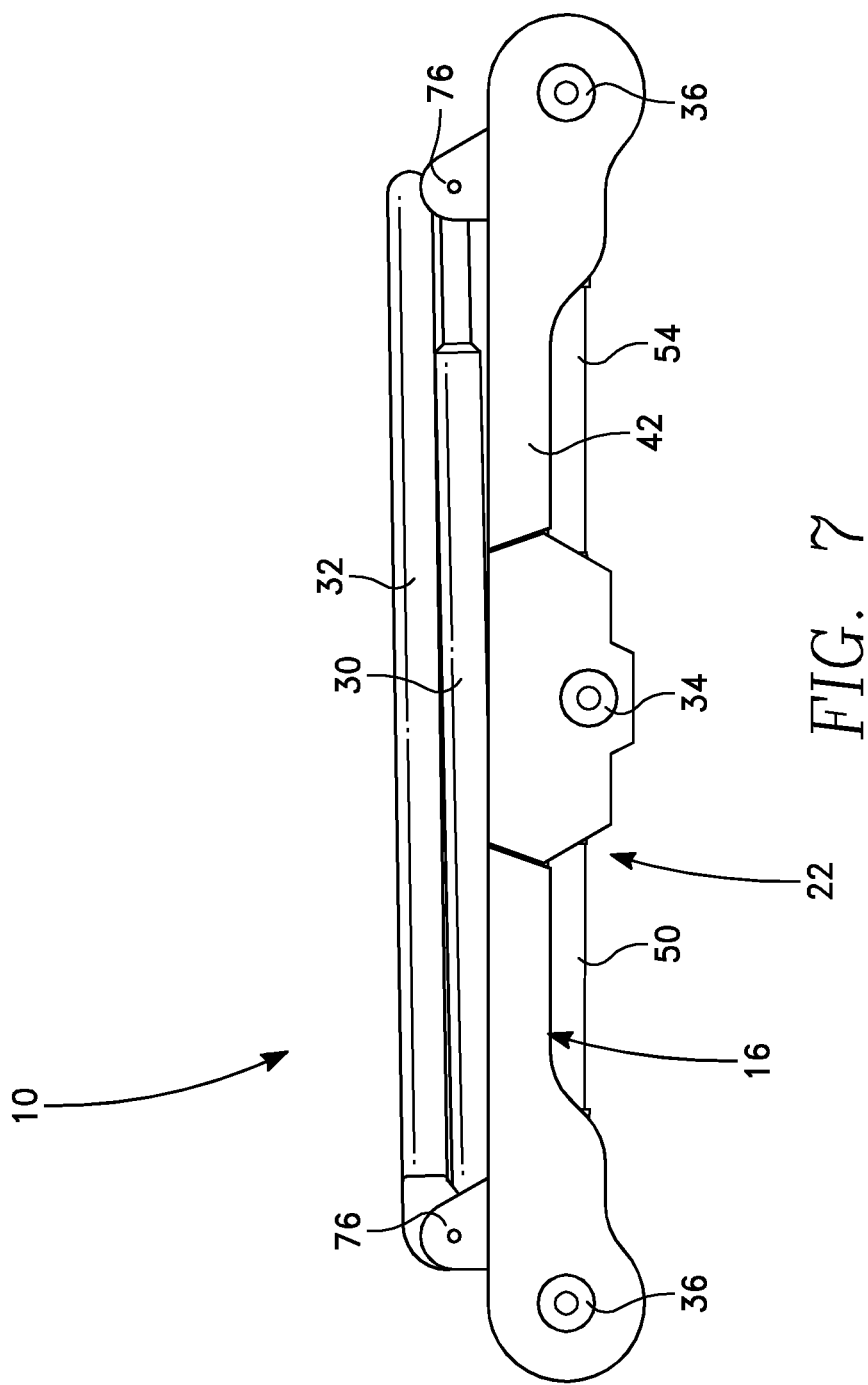
FIG. 7 is a side view of the bike trailer of the instant invention in the folded storable position with the wheels and tow bar unattached.

In the storage configuration seen in FIGS. 6-7 the wheels 12, 14 and tow bar 18 are removed and the back 32 and foot 30 sections are pivoted to overlay the main frame 16 and the legs 50, 52, 54, 56 are pivoted and locked in a storage position flush with the main frame 16. The wheels 12, 14 can be stored in a parallel plane along with the main frame 16 and the tow bar 18 and hitch 24 can also be stored in this space since they are detachable into two parts and formulated in a similar angular configuration thereby making for an ergonomic situation when the device 10 is not in use.

FIGS. 12A-13 show the mechanism for allowing the legs/sidewalls 50, 52, 54, 56 to pivot from a leg position to a vertical wall position 50A, 52A, 54A, 56A and to the a position flush with the main frame 16 for storage. Vertical release pins 62 are located on either of the front/foot 30 and back 32 sides 40, 44 of the main frame 16. Attached to these pullable vertical pins 62 are cables 64 that extend in either direction along the length of the sides 40, 44 and attaching to horizontal release pins 66 that secure the legs 50, 52, 54, 56 into place. When the vertical release pin 62 is pulled in an upward direction 70 tension is applied to the cables 64 which in turn pull the horizontal release pins 66 out of place thereby releasing the securement of the legs/sidewalls 50, 52, 54, 56 allowing them to be rotated into the desired position. Once in the desired position, the horizontal release pins 66 are secured into place and the vertical release pin 62 moved back into the secure position. The legs/sidewalls 50, 52, 54, 56 rotate along the axis of the end wheel attachments 36 on the sides 42, 44 of the main frame 16 to provide the desired configuration.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A convertible device that is towable behind a towing vehicle comprising:
    a main frame portion said main frame portion being substantially rectangular shape and having a first side, a second side, a third side and a fourth side wherein said first and third sides are substantially parallel to each other while said second and fourth sides are substantially parallel to each other wherein each side is substantially linear having a first end and a second end and a middle portion;
    a first attachment means located on said first end of said first and third sides;
    a second attachment means located on said second end of said first and third sides;
    a third attachment means located on said middle portion of said first and third sides;
    a first detachable wheel for attachment to one of said first, second or third attachment means and a second detachable wheel for attachment to a second of said first, second or third attachment means wherein said first and second wheels are attached in positions parallel to each other;
    a first foldable portion attached to said second side of said main frame portion wherein said first foldable portion is rotatable at least 180 degrees;
    a second foldable portion attached to said fourth side of said main frame portion wherein said second foldable portion is rotatable at least 180 degrees;
    a first pair of legs attached to said first ends of said first side and said second side that is rotatable at least 180 degrees around said attachment means;
    a second pair of legs attached to said second ends of said first side and said second side that is rotatable at least 180 degrees around said attachment means; and
    a tow bar that is attached to said main frame portion in at least one point on said main frame portion.

2. The convertible device as defined in claim 1 wherein said second and fourth sides are hollow.

3. The convertible device as defined in claim 2 wherein a first vertical pull pin is located substantially in the center of said second side and a second vertical pull pin is located substantially in the center of said fourth side wherein said first and second pull pins are attached to cables that extend through said hollow portions an attached to a first horizontal release pin one side and a second horizontal release pin on said second side wherein the action of pulling up on either of said vertical pull pins releases each of said horizontal release pins wherein said release pins releasably attach to said first sides and/or said second sides of said first and third sides of said main frame.

4. The convertible device as defined in claim 1 wherein said tow bar attaches to said second side of said main frame and extends in a diagonal direction and attaches a second time to said first side of said main frame and then extends outward from main frame.

5. The convertible device as defined in claim 4 wherein a handle is attachable to said tow bar to create flexibility in attachment to a tow vehicle.

6. The convertible device as defined in claim 5 wherein said handle is rotatable.

7. The convertible device as defined in claim 1 wherein a sturdy material is attached to said first foldable portion and extended and attached to said second foldable portion creating a surface therebetween.

8. The convertible device as defined in claim 7 wherein a further section of sturdy material is attached connecting said first foldable portion and said second foldable portion creating an enclosed space between said main frame, said first fold portion and said second foldable portion.

9. The convertible device as defined in claim 1 wherein said first pair of legs and said second pair of legs are folded inward and flush in the same plane with said main frame portion.

10. The convertible device as defined in claim 1 wherein said first pair of legs and said second pair of legs are rotated downward from said main frame portion thereby creating a study support for said main frame portion.

11. The convertible device as defined in claim 1 wherein said first pair of legs and said second pair of legs are rotated upward from said main frame portion thereby creating support for sidewalls that can be enclosed or secured thereby creating a space for the placement of items therein.

12. The convertible device as defined in claim 1 wherein said first pair of legs is extended outward and flush in the same plane with said main frame portion while said second pair of legs is rotated substantially 90 degrees from said main frame portion thereby creating a handle with said first pair of legs and a platform to hold items to be moved with said second pair of legs.

* * * * *